No. 830,820. PATENTED SEPT. 11, 1906.
E. BAUSCH.
PHOTOGRAPHIC LENS MOUNT.
APPLICATION FILED JUNE 22, 1903.

4 SHEETS—SHEET 1.

Witnesses. Inventor.
Walter B. Payne. Edward Bausch
Clarence A. Bateman. by Frederick F. Church
His Attorney.

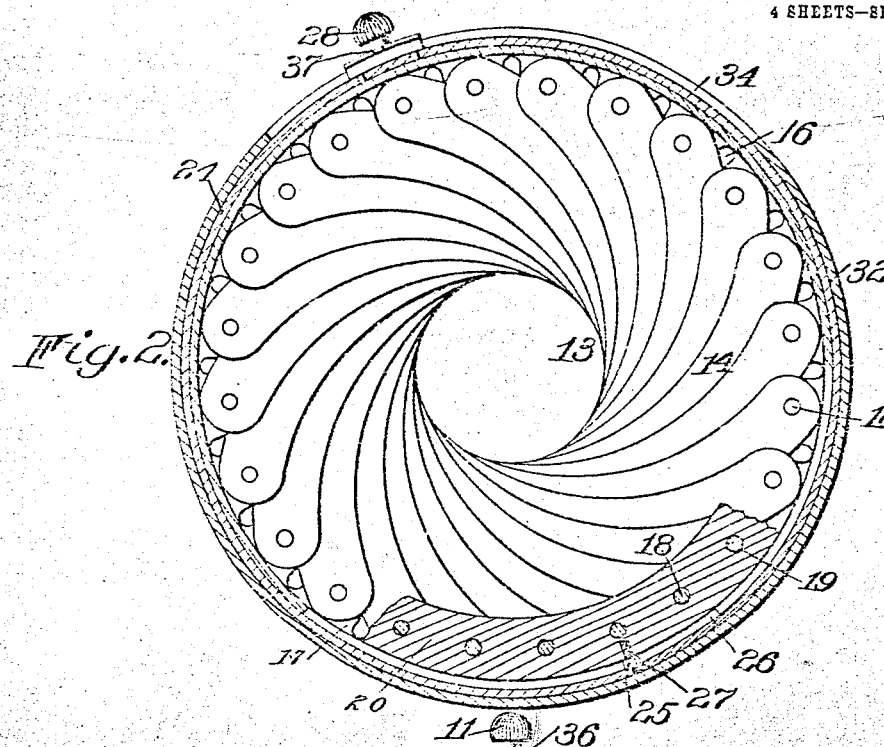

No. 830,820. PATENTED SEPT. 11, 1906.
E. BAUSCH.
PHOTOGRAPHIC LENS MOUNT.
APPLICATION FILED JUNE 22, 1903.

4 SHEETS—SHEET 3.

Witnesses.
Walter B. Payne.
Clarence A. Bateman.

Inventor.
Edward Bausch
by Frederick F. Church
his Attorney

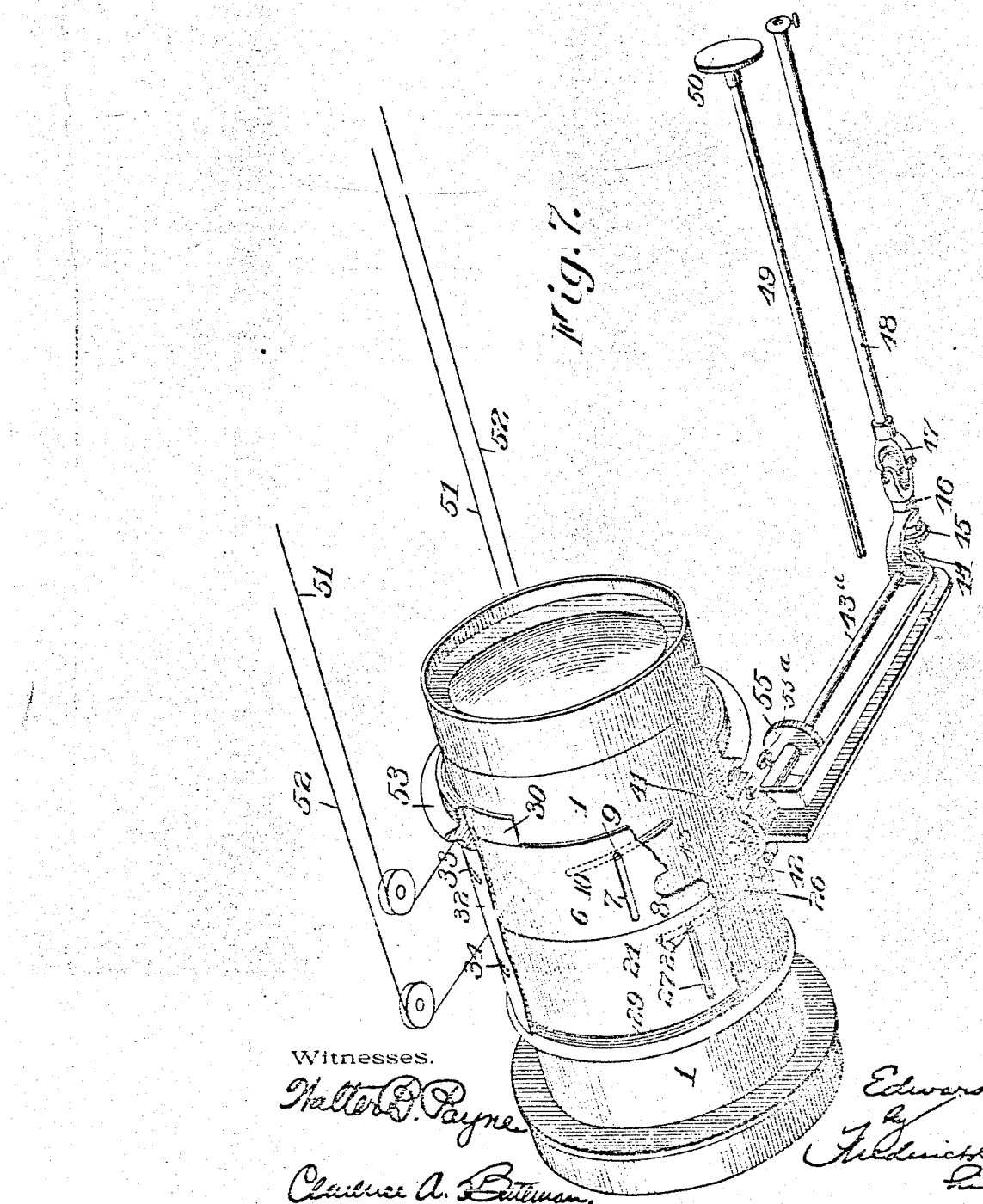

UNITED STATES PATENT OFFICE.

EDWARD BAUSCH, OF ROCHESTER, NEW YORK, ASSIGNOR TO BAUSCH & LOMB OPTICAL COMPANY, OF ROCHESTER, NEW YORK, A CORPORATION OF NEW YORK.

PHOTOGRAPHIC-LENS MOUNT.

No. 830,820.     Specification of Letters Patent.     Patented Sept. 11, 1906.

Application filed June 22, 1903. Serial No. 162,538.

*To all whom it may concern:*

Be it known that I, EDWARD BAUSCH, of the city of Rochester, in the county of Monroe and State of New York, have invented certain new and useful Improvements in Photographic-Lens Mounts; and I do hereby declare the following to be a full, clear, and exact description of the same, reference being had to the accompanying drawings, forming part of this specification, and to the reference-numerals marked thereon.

My present invention relates to improvements in photographic-lens mounts, and more especially to that class particularly applicable to portraiture and analogous uses; and it has for its object the production of a device of this character embodying novel means for altering the relation between certain lenses to produce a diffusion between the emergent rays thereof to soften or vary to any desired degree the sharpness of the projected image.

It is also an object of my said invention to provide improved devices for operating the diaphragm and for focusing the lens, all of which may be operated independently and conveniently from any desired position exterior to the mount or other parts of the apparatus.

Other features of novelty and advantage will be hereinafter more fully explained, and pointed out in the claims hereunto annexed.

Figure 1:
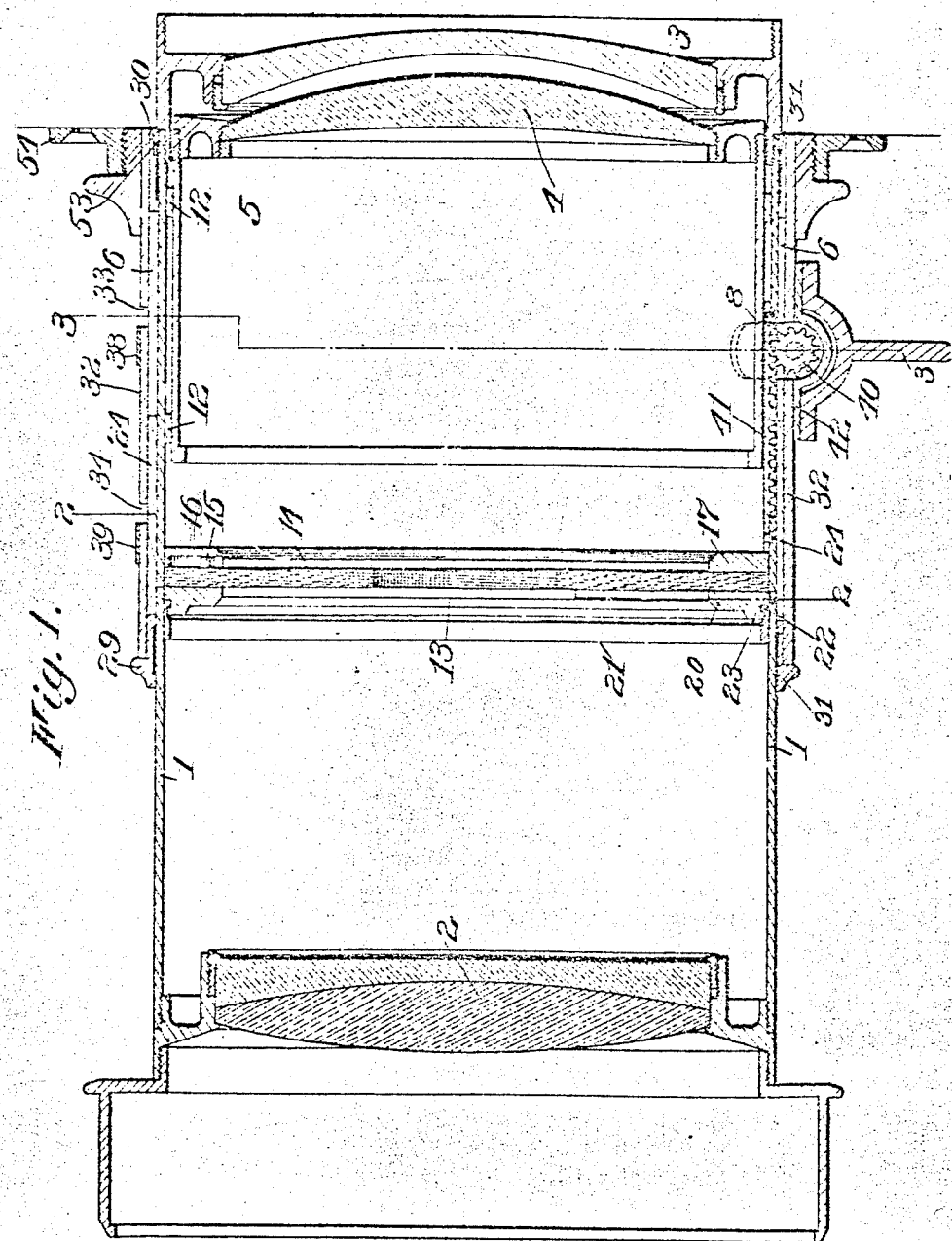
Figure 4:
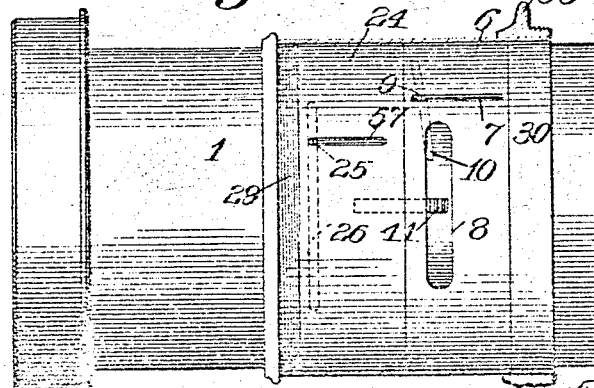
Figure 5:
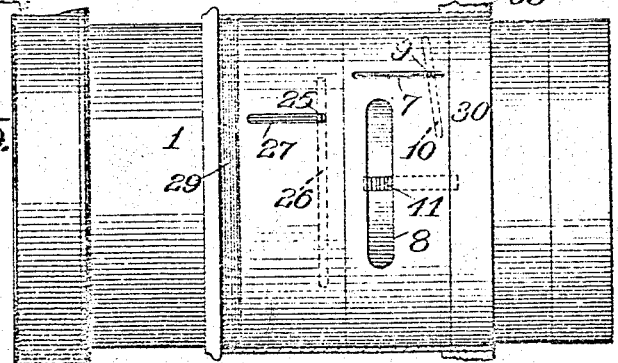
Figure 6:
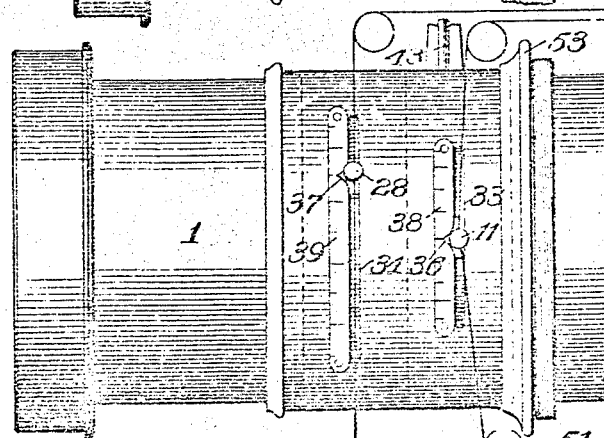

In the drawings, Figure 1 is a central longitudinal sectional view of a photographic-lens mount embodying my said invention. Fig. 2 is a transverse sectional view on the line 2 2 of Fig. 1. Fig. 3 is a similar view on the line 3 3 of Fig. 1. Figs. 4 and 5 are exterior views of the mount with parts broken away to clearly illustrate the positions of certain parts in focusing. Fig. 6 is a view showing the operating devices for the several parts. Fig. 7 is a perspective view of the mount, parts being broken away to clearly illustrate the various operating devices.

Similar reference-numerals in the several figures indicate similar parts.

In the present embodiment of my invention, 1 designates the lens-tube, in the forward portion of which is mounted the anterior combination 2, and at the rear of this tube is mounted one of the lenses or members 3 of the posterior combination. The anterior combination and the member 3 of the posterior combination when in position within the tube are preferably in fixed relation.

In proximity to the lens member 3 of the posterior combination is located the lens member 4, mounted in the carrier-ring 5, slidably mounted within the tube. These lens members are so arranged within the tube that their focal points will be coincident when said members occupy a certain predetermined relative position, but will be at variance when the relative position of said lens members is altered. To produce a relative movement to any desired degree between said lenses 3 and 4, I have illustrated in the present embodiment a device comprising an annular sleeve 6, loosely fitted over the tube, provided with the longitudinal slot 7 and the circumferential slot 8.

In the slot 7 rests the pin 9, passing through the diagonal cam-slot 10 in the tube and secured rigidly to the carrier-ring 5. At a convenient position on this sleeve 6 is also provided an operating-pin 11, the parts being so arranged that rotation of the sleeve 6 in the proper direction will move the pin 9 in the slot 10 to cause the carrier-ring 5, carrying the lens 4, to approach or recede from the lens 3. Spacing or supporting rings 12 may be interposed between the carrier 5 and tube 1, if desired, to insure smooth operation of the parts.

Between the front and rear lenses 2 and 3 4, respectively, is interposed an iris-diaphragm 13, made up of a plurality of leaves 14 of any preferred type, the pivot projections 15 at one end of said leaves resting in the slots 16 of the stationary ring 17 and the pivot projections 18 upon the opposite ends of said leaves resting in the apertures 19 of the ring 20. This ring 20 is rotatably mounted within the tube, a guiding-ring 21 being provided, having a guiding-flange 22, adapted to be engaged by the flange 23 of the ring 20. Over the tube is also loosely fitted a second sleeve 24, provided with a longitudinal slot 27 to coöperate with a pin or projection 25, rigidly secured to the diaphragm-ring 20, said pin passing through the circumferential slot 26 in the casing to enter the longitudinally-disposed slot 27 of the sleeve 24. An operating projection 28 is provided, by means of which the sleeve 24 may be rotated in either direction, and thereby cause the projection 25 to transmit rotary motion to the diaphragm-ring 20 to increase or diminish the aperture or stop in the diaphragm. Over the tube upon each side of the sleeves 6 24 may be provided bearing-rings 29 30, respectively, a felt binding-strip 31 being interposed between said rings and tube, if desired, to form a bearing. A casing 32 is tightly fitted over these rings 29 30 in such manner as to permit rotation of the sleeves 6 24, circumferential slots 33 34 being provided, through which extend the operating projections 11 28, respectively. These projections 11 28 are each preferably provided with an indicator or pointer 36 37, respectively, each registering with a calibrated or graduated scale 38 39, respectively.

Passing through the circumferential slot 8 is a pinion 40, meshing with a rack 41, carried by the tube, a bracket 42 being provided for supporting the operating-shaft 43. If desired, an extension may be provided for operating the shaft 43 at any desired distance, such as from a point in rear of the camera-box to which the lens-mounting is attached, and in the present embodiment I provide a milled operating-head 55, rigidly attached to the shaft 43, having a set-screw 55ª for connecting and disconnecting an extension-shaft 43ª therewith, a pair of bevel-gears 44 45 being interposed between the shafts 43ª and 46 and a universal joint 47 being provided, to which is attached the sleeve 48, carrying the adjustable extension 49, provided with a milled operating-head 50.

Controlling means, such as the lines 51 52, may be run over pulleys or other devices to the operating-studs 11 28, respectively, whereby said parts may be adjusted by the operator from the rear of the camera-box and when he is beneath the focusing-cloth.

A flange 53 may be tightly fitted over the casing 32 and provided with screw-threads or the like to receive the ring 54, by means of which the lens-mount is supported. As the casing 32 will thus be held stationary, operation of the milled head 50 will cause the tube to move either forwardly or rearwardly within the casing to properly focus the lens. A milled head 55 is also provided for operating the focusing device immediately adjacent the lens.

By forming the slots 7 27 longitudinally in the rings 6 24, respectively, it is obvious that the pins 9 25 will operate their corresponding parts irrespective of the position of the tube within the casing 32. It is also obvious that the circumferential slot 8 in the ring 6 permits the rotation of the latter without interference with the pinion 40.

In employing a portrait-lens of the character hereinbefore described the focusing is effected by operating either of the heads 50 or 55 in the proper direction to move the lens-tube forwardly or rearwardly within the supporting-casing 32, at which time the projection 28 for adjusting the diaphragm should be at zero to give a full-size aperture. After the focusing has been accomplished the projection 11 may be moved to vary the distance between the lenses 3 and 4 to produce the desired amount of diffusion of the rays of light passing through the lens and cause the image to be softened to the desired degree. To guide the operator in this operation, either the calibrated scale 38 may be employed or the desired effect may be obtained by visual observation of the projected image. The lens may then be stopped to the desired degree by operating the projection 28, connected to the diaphragm, the effect being observed visually, or, if desired, the calibrated scale 39 may be employed.

Of course it will be understood that while the above course has been outlined for portrait work other arrangements of the parts and different uses may suggest themselves that would come within the scope of my said invention. It will also be understood that while I have shown and described but one embodiment of my invention, I do not so limit myself, as changes—such, for instance, as in the arrangement of the lens elements or members—could be made therein within the scope of the claims without departing from the spirit of my invention.

I claim as my invention—

1. The combination with a lens-tube having the anterior and posterior lens combinations arranged therein, one of the combinations embodying a relatively fixed element and an element slidable longitudinally of the tube, of a rotatable sleeve operable from the exterior of the tube and an operating device between the sleeve and slidable element for longitudinally adjusting the movable element.

2. The combination with a casing, a lens-tube movable therein, having a lens combination arranged therein, and a movable carrier within the lens-tube and carrying one of the elements of the lens combination, of devices carried by the casing and operable from the exterior thereof for adjusting the movable carrier.

3. The combination with a lens-tube, and relatively fixed and movable lenses carried by said tube, of a casing movably supporting said tube, and devices guided by and operable from the exterior of said casing irrespective of the relative position of the latter and said tube for varying the relation of the lenses of the tube.

4. In a photographic lens-mount, the combination with a casing, and an adjusting-sleeve inclosed therein and operable from the exterior of the casing, of a lens-tube adjustable axially within the casing having the anterior and posterior lens combinations arranged therein, an element of one of the combinations being adjustable axially of the tube, and an operative connection between said element and the adjusting-sleeve permitting a relative axial adjustment of the tube.

5. The combination with a lens-tube, and lenses arranged therein including an axially-movable lens, of devices operable from the exterior of said tube for adjusting the relation between said lenses, to produce a diffusion of the emergent rays thereof embodying a rotatable ring and devices operated thereby for adjusting the movable lens axially of the tube.

6. The combination with a lens-tube and lens combinations arranged therein, one of said combinations being composed of relatively movable members, of devices for varying the relation between said members, and a rotatable sleeve surrounding said tube for operating said devices.

7. The combination with a casing, and a lens-tube movable axially therein and having the lens combinations arranged therein, of a carrier movable axially of the tube and carrying one of the lens elements, a rotatable operating-sleeve guided by the casing, and operating means connecting the sleeve and carrier at different relative positions of the tube and casing.

8. The combination with a casing, and a lens-tube movable axially therein and having the lens combinations arranged therein, of a carrier movable axially of the tube and carrying one of the lens elements, a projection on the carrier, means coöperating with the projection to operate the carrier axially of the tube, and a rotatable operating-sleeve carried by the casing having a longitudinal slot therein coöperating with the projection of the carrier at different relative positions of the tube and casing.

9. The combination with a casing, a lens-tube adjustable axially within the casing having a cam-slot therein, and the lens combinations arranged in the tube, of a carrier guided to move axially of the tube and carrying a lens element of one of the combinations, a projection on the carrier coöperating with the cam-slot of the tube, and a rotatable sleeve carried by the casing having an axially-arranged slot coöperating with said projection for operating it while the tube occupies different positions in the casing.

10. In a photographic-lens mount, the combination with a lens-tube, and lenses carried thereby, of an axially-movable carrier in the tube containing one of the lenses thereof and having a projection thereon, a rotatable sleeve arranged on the exterior of the tube and operatively engaging said projection, the lens-tube having means coöperating with said projection to produce an axial movement of the lens-carrier when a relative rotary movement is imparted to said sleeve.

11. The combination with a lens-tube and lenses mounted therein, of a movable carrier, a lens in said carrier, a rotatable sleeve surrounding the tube, means for transmitting motion from said sleeve to said carrier, and means for operating said sleeve, from the exterior of the tube.

12. The combination with a lens-tube and lenses mounted therein, of a movable carrier also carrying a lens, a rotatable sleeve surrounding said tube, means interposed between said sleeve and carrier for transmitting motion to the latter, means located exterior to said tube for operating said sleeve, and a calibrated scale for said means.

13. The combination with a lens-tube and lenses mounted therein, of a carrier movable longitudinally of said tube, a lens in said carrier, a movable member carried by said tube, means between said member and carrier for adjusting the position of the latter, a supporting-casing within which said tube is longitudinally movable, and devices exterior to said casing and connected to said member for operating the latter irrespective of the position of said tube within said casing.

14. The combination with a lens-tube, lenses mounted therein, and a casing within which said tube is longitudinally movable, of a lens movable relatively to said first lenses, and devices located exterior to said casing for adjusting the position of said movable lens.

15. The combination with a lens-tube, lenses in fixed relation therein, and a casing within which said tube is movably mounted, of a relatively movable lens, and devices exterior to said casing for adjusting the position of said movable lens irrespective of the relative position of said tube and casing.

16. The combination with a lens-tube, lenses therein, and a casing within which said tube is movably mounted, of a lens and carrier movable relatively to said first lenses, operating devices operable from the exterior of said casing, and connections interposed between said carrier and operating devices.

17. The combination with a lens-tube, lenses mounted therein, and a casing movably supporting said tube, of a carrier having a lens mounted therein, a member revoluble on said tube, devices for causing the rotary motion of said member to move said carrier longitudinally of said tube, and an operating device connected to said member and operable from the exterior of said casing.

18. The combination with a lens-tube, and lenses therein, of a lens and carrier adjustably mounted in said tube, operating devices for said carrier, and flexible operating-cords connected to said devices for operating the latter from a distance.

19. The combination with a lens-tube and lenses mounted therein, of a diaphragm within said tube having a rotatable adjusting-ring, a casing within which said tube is longitudinally movable, and devices exterior to said casing for operating the ring of said diaphragm irrespective of the relative positions of said tube and casing.

20. The combination with a lens-tube, and lenses mounted therein, and an adjustable diaphragm carried by said tube, of a casing within which said tube is movably mounted, a movable member between said tube and casing, operating devices connecting said member and diaphragm, and means guided to rotate on the casing for operating said member, irrespective of the relative positions of said tube and casing.

21. The combination with a lens-tube, and a diaphragm carrying a movable part mounted therein, of a casing within which said tube is longitudinally movable, a movable member connected to the movable part of said diaphragm and means rotatably guided by said casing for operating said member.

22. The combination with a lens-tube, and a diaphragm provided with an adjusting-ring mounted therein, of a casing within which said tube is movable, an operating device guided by said casing and connected to said adjusting-ring, irrespective of the relative positions of said tube and device, and means for operating said device irrespective of the relative positions of said tube and casing.

23. The combination with a lens-tube, and a diaphragm provided with an adjusting-ring mounted therein, of a casing within which said tube is longitudinally movable, a movable member interposed between said tube and casing and connected to said adjusting-ring, means for operating said member irrespective of the relative positions of said tube and casing, and a calibrated scale for said diaphragm.

24. In a lens-mount, the combination with a support, of a lens-tube adjustable axially within said support, a laterally-extending bracket attached to the support, a shaft journaled in said bracket and operatively connected to the lens-tube for adjusting it, an operating-head on said shaft, and an extension having universal connection with said shaft and having means thereon for adjusting the lens-tube at a distance.

25. In a lens-mount, the combination with a suitable support, of a lens-tube axially adjustable therein, a laterally-extending bracket secured to the support, an operating-head carried by the bracket having operative connection with the lens-tube for axially adjusting the latter, a shaft journaled in said bracket, a device for connecting and disconnecting said shaft and operating-head, and a universally-movable extension operatively connected to said shaft and having a second operating-head thereon.

26. In a lens-mount, the combination with a casing, of a lens-tube axially adjustable therein and containing the lenses, one of the latter being adjustable axially relatively to the others, an adjusting-sleeve rotatably mounted between the lens-tube and casing and operatively connected to the relatively adjustable lens, said sleeve having a circumferentially-arranged slot therein, a bracket secured to the casing, and an operating device supported on said bracket and having a part extending through said slot and coöperating with the lens-tube to operate it.

27. In a lens-mount, the combination with a hollow casing, of a lens-tube axially adjustable in said casing having a lens element axially adjustable therein, a rotatable lens-adjusting sleeve surrounding said tube and inclosed by the casing, said sleeve being operatively connected to the adjustable-lens element in the lens-tube and having an operating part extending to the exterior of the casing, an adjustable diaphragm mounted in the lens-tube, a rotatable diaphragm-adjusting sleeve surrounding the exterior of the tube beside the first-mentioned sleeve and inclosed by the casing having operative connection with the diaphragm, said diaphragm-adjusting sleeve having an operating part extending to the exterior of the casing, and spaced bearing-rings fitted in the ends of the casing and coöperating with the edges of said lens and diaphragm-adjusting sleeves to prevent relative axial movement between them and the casing.

28. The combination with an annular casing having a circumferential slot therein, and a lens-tube adjustable axially of the casing and having the lens combinations arranged therein, of a diaphragm mounted in the tube having a rotatable adjusting member, the latter having a projection thereon extending to the exterior of the tube, a rotatable sleeve surrounding the tube having an axial slot therein coöperating with the projection of the diaphragm-adjusting member at different relative positions of the tube and casing, and an operating portion attached to the sleeve and extending through the slot of the casing for adjusting the diaphragm from the exterior thereof.

29. The combination with a lens-tube, lenses in fixed relation, and a relatively movable lens within said tube, of a supporting-casing, devices interposed between said tube and casing to vary the longitudinal adjustment thereof, and means between said tube and casing for adjusting the position of said movable lens within said tube.

30. The combination with a lens-tube, relativly fixed lenses, and a relatively movable lens within said tube, and an adjustable diaphragm carried by said tube, of a supporting-casing, means for adjusting said tube longitudinally of said casing, devices for adjusting said movable lens, and devices for adjusting said diaphragm irrespective of the relative positions of said tube and casing.

EDWARD BAUSCH.

Witnesses:
  WM. G. WOODWORTH,
  W. V. KEIL.